United States Patent [19] [11] 4,067,850
Kohler et al. [45] Jan. 10, 1978

[54] FILAMENTS AND FIBERS HAVING IMPROVED DYEABILITY PREPARED FROM BIS ETHOXYLATED TETRAMETHYL BISPHENOL A

[75] Inventors: Armin Kohler; Herbert Pelousek, both of Dormagen-Hackenbroich; Ekkehard Frohberg, Dormagen, all of Germany

[73] Assignee: Bayer Aktiengesellschaft, Leverkusen, Germany

[21] Appl. No.: 651,049

[22] Filed: Jan. 21, 1976

[30] Foreign Application Priority Data

Jan. 23, 1975 Germany .............................. 2502551

[51] Int. Cl.$^2$ ...................... C08G 63/18; C08G 63/66

[52] U.S. Cl. ................................... 260/47 C; 8/39 C; 264/210 F

[58] Field of Search ...................................... 260/47 C

[56] References Cited

U.S. PATENT DOCUMENTS

| | | | |
|---|---|---|---|
| 3,703,372 | 11/1972 | Merrill | 96/1.6 |
| 3,794,617 | 2/1974 | Mains et al. | 260/47 C |

*Primary Examiner*—Lester L. Lee
*Attorney, Agent, or Firm*—Plumley and Tyner

[57] ABSTRACT

Filaments and fibers having improved dyeability comprising a terephthalic acid copolyester containing bis ethoxylated tetramethylbisphenol A in cocondensed form.

7 Claims, No Drawings

FILAMENTS AND FIBERS HAVING IMPROVED DYEABILITY PREPARED FROM BIS ETHOXYLATED TETRAMETHYL BISPHENOL A

This invention relates to polyester fibers and filaments which have improved dyeability.

The production of filaments and fibers from linear filament-forming polyesters has been known for some considerable time. To this end, dicarboxylic acids are reacted with diols to form high molecular weight linear polyesters which are subsequently spun. Suitable dicarboxylic acids are, for example, terephthalic acid, isophthalic acid and hexahydroterephthalic acid. Ethylene glycol, 1,4-butane diol, 1,3-propane diol or 1,4-bis-(hydroxymethyl)-cyclohexane are mentioned as examples of suitable glycols. The most well known representative of this class of polyesters is polyethylene terephthalate.

The filaments produced from polyesters of this kind by melt spinning are normally bundled, stretched in hot water or another medium, fixed in hot air, crimped and cut. The fibers produced in this way normally have a strength of from 2.5 to 4.5 p/dtex, an elongation of from 20 to 50% and a boiling-water induced shrinkage of from 0 to 3%. Textiles with excellent wearing properties, such as high crease resistance, low water absorption and, hence, easy drying, or high strength and good abrasion resistance, can be produced from fibers of this kind.

Since it is preferred for reasons of cost not to process spun-dyed filaments for the production of textiles, the process described above has to be followed by a dyeing process. This dyeing process frequently involves difficulties because textiles based on polyester fibers, especially those produced from polyesters based on terephthalic acid and ethylene glycol and/or 1,4-bis-(hydroxymethyl)-cyclohexane, are not easy to dye in a normal dyeing process.

Accordingly, the following methods of dyeing have been developed for polyester fiber materials and for blends of polyester fibers with other fibers:
1. the carrier dyeing method carried out at boiling temperature; and
2. the high-temperature (HT)-dyeing method carried out at 120° to 135° C for polyester fibers and their blends with cellulose fibers, and at 104° to 106° C for polyester fiber/wool blends.

Carriers have to be added in cases where dyeing is carried out at boiling temperatures and at temperatures in the range of from 104° to 106° C. In cases where dyeing is carried out at temperatures in the range of from 120° to 135° C, the diffusion rate of the dyes is normally increased to such an extent that, under these conditions, relatively high percentages of dye are attached to the polyester fibers fairly quickly even in the absence of carriers. It has been found, however, that, even in the high-temperature process it is advantageous to use relatively small quantities of carrier for certain disperse dyes and also for polyester fibers having a relatively low affinity for dyes. The carriers used are inter alia combinations based on o-phenyl phenol, chlorinated benzenes or phenols. In most cases, these compounds are physiologically not without risk. In other words, they should not be breathed in, should not come into contact with the skin and, in addition, should be removed as far as possible from the effluent, because they can never be completely biologically degraded, if at all.

Accordingly, it is desirable, both for eliminating health risks and for reasons of cost not only in regard to dyeing, but also in regard to effluent treatment, to provide polyesters, especially based on terephthalic acid and ethylene glycol, 1,4-butane diol and/or 1,4-bis-(hydroxymethyl)-cyclohexane, which can be dyed in the absence of carriers.

The works which have been carried out in this field are manifold and numerous. For example, attempts have been made to incorporate other dicarboxylic acids or other diols into the polymer chain of terephthalic acid and ethylene glycol and/or 1,4-bis-(hydroxymethyl)-cyclohexane, in order in this way to disturb and loosen up the internal structure and the crystalline structure of the fibers so that the dyes may penetrate more readily into the interior of the filament.

Small quantities of, for example, sebacic acid or adipic acid, 2,6-naphthalene dicarboxylic acid, 4,4'-diphenyl dicarboxylic acid or 2,5-dimethoxy terephthalic acid, have been used for varying the dicarboxylic acid component.

In addition to ethylene glycol and 1,4-bis-(hydroxymethyl)-cyclohexane, 1,3- and 1,2-propane diol, 1,4-butane diol or bis-ethoxylated hydroquinone or bis-ethoxylated p,p'-dihydroxy diphenyl dimethyl methane, have proved to be suitable diols for co-condensation.

These dicarboxylic acids and/or diols are co-condensed with the polyester under the usual conditions, and give copolyesters with a more or less improved affinity for dyes.

However, fibers based on copolyesters produced in this way are frequently unsatisfactory in regard to their textile properties.

It has now surprisingly been found that filaments and fibers produced from polyesters which contain from 4 to 15% by weight of bis-ethoxylated tetramethyl bisphenol A (I) in chemically co-condensed form, show excellent textile properties in addition to an outstanding affinity for dyes in the absence of carriers.

It is an object of this invention, therefore, to provide polyester filaments and fibers that can easily be dyed without using a carrier. Further objects will be evident from the following description and the examples.

These objects are accomplished by filaments and fibers comprising terephthalic acid copolyesters which contain from 4 to 15% by weight of a glycol corresponding to the following formula (I):

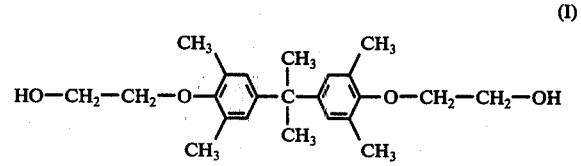

in chemically co-condensed form.

The polyesters of which the filaments and fibers according to the invention consist preferably contain from 5 to 12% by weight of the glycol of formula (I) above in chemically co-condensed form.

In addition, they preferably contain as their main glycol component a glycol from the series ethylene glycol, 1,4-butane diol, 1,4-bis-(hydroxymethyl)-cyclohexane or a mixture of these glycols.

In addition to terephthalic acid, the terephthalic acid copolyesters may also contain small quantities of other dicarboxylic acids, such as hexahydroterephthalic acid, adipic acid, sebacic acid and/or isophthalic acid.

The filaments and fibers according to the invention are obtained by melt-spinning a terephthalic acid copolyester, followed by aftertreatment in known manner, i.e. by the stages of stretching, fixing, optionally crimping and cutting to staple length.

The terephthalic acid copolyesters should preferably have a relative viscosity, as defined hereinafter, as follows:
Polyethylene terephthalate,
 1.35–2.02, preferably 1.42–1.83;
polybutylene terephthalate,
 1.53–1.97, preferably 1.55–1.93;
polyterephthalate acid ester,
 1.33–2.15, preferably 1.57–2.06;
of 1,4-cyclohexane dimethanol The copolyesters used for the production of the filaments and fibers according to the invention are obtained in known manner by carrying out the transesterification of, for example, dimethyl terephthalate or the esterification of terephthalic acid with a glycol, such as ethylene glycol, 1,4-butane diol or 1,4-bis-(hydroxymethylcyclohexane) in the presence of such a quantity of bis-hydroxyethyl tetramethyl bisphenol A of the formula (I) that, on completion of polycondensation, carried out in known manner after transesterification or esterification, the polyester contains from 4 to 15% by weight of the glycol of formula (I) in chemically co-condensed form. The general reaction conditions for the production of these copolyesters are substantially as follows for the various types:

The filaments according to the invention have the normal properties of filaments of the non-modified terephthalic acid polyester, such as for example a strength of about 2.5 to 3.5 p/dtex at 20 to 25% elongation. The colour and whiteness of the fibers produced by the method described above are also unchanged.

It is only the dye-absorption capacity of the fibers according to the invention which is so greatly increased that textiles of these fibers can be dyed in the absence of carriers.

X-ray photographs of fibers of the claimed terephthalic acid copolyesters, by comparison with fibers of the terephthalic acid polyester with only one glycol component show that they contain a smaller number of crystalline zones.

A smaller proportion than 4% of the glycol of formula (I) in the copolyester produces only an inadequate increase in dyeability, so that once again dyeing has to be carried out with the aid of carriers.

With a content of more than 15% by weight of the glycol of formula (I) in the terephthalic acid copolyester, the actual character of the fibers of the unmodified homopolyester of terephthalic acid is excessively modified, as reflected in their reduced melting point and also in their reduced strength and abrasion resistance, and in the fact that spinning is interrupted by more disturbances.

The relative viscosity of the terephthalic acid copolyesters is the ratio between the viscosity of a 1% solution of the polyester in o-chlorophenol and the viscosity of the pure o-chlorophenol, as measured in the same units at 25° C, measured in an Ubbelohde viscosimeter.

Dyeing tests show that staple fibers produced from a copolyester according to the invention can be dyed as quickly and as deeply in the absence of carriers as staple fibers of the homopolyester can in the presence of carriers.

For the comparison measurements, dyeing was carried out by the following methods (cf. H. Ludewig "Polyesterfasern" Akademie Verlag Berlin, 1965, page 346).

METHOD 1

The fibers are thoroughly washed before dyeing. The goods to liquor ratio amounts to 1:20. For dyeing in the presence of a carrier, 4 g/l of a standard commercial-grade carrier (Levegal ® PT, a product of Bayer AG, Leverkusen) are added to the solution. A pH-value of from 4.5 to 5.5 is then adjusted with monosodium phosphate and acetic acid. This is followed by the addition to the solution of 2% by weight of the disperse dye:

| Glycol component | Molar ratio of dimethyl terephthalate to glycol | Transesterification Temp °C | Time hours | Pressure | Precondensation Temp °C | Time hours | Pressure | Polycondensation Temp °C | Time hours | Pressure |
|---|---|---|---|---|---|---|---|---|---|---|
| Ethylene glycol | 1:1 to 1:3 | 150–220 | 2–3 | normal pressure | approx. 250 | 0.5–1 | normal pressure | 275–295 | 0.5–3.5 | <1 Torr |
| 1,4-butane diol | 1:1 to 1:2 | 150–220 | 2–4 | normal pressure | — | — | — | 220–270 | 0.5–3.5 | <1 Torr |
| 1,4-cyclohexane dimethanol | 1:1 to 1:1.5 | 180–280 | 1–2 | decreasing from 8 atms gauge to normal pressure | — | — | — | 295–300 | 0.5–3.0 | <1 Torr |

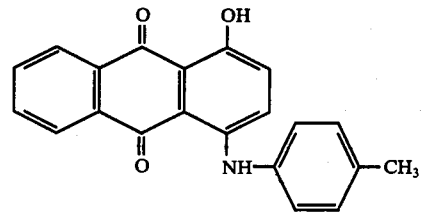

After readjustment of the pH-value, if necessary, the dye bath is heated to 80° – 85° C over a period of 20 minutes and is kept at that temperature for 15 to 20 minutes. The carrier develops its softening effect during this residence time. The bath is then heated to boiling point over another 30 minutes and left at that temperature for 1 hour. On completion of dyeing, the dyed material is warm-rinsed in water and then dried.

METHOD 2

For dyeing in the absence of a carrier, the dyeing is carried out in exactly the same way as in Method 1, except that no carrier is added to the solution. The tests reproduced in the Examples show that the staple fibers according to the invention can be dyed as deeply with basic dyes or with disperse dyes in the absence of carriers as fibers of the pure polyester can in the presence of carriers.

The results of these tests were checked more accurately by determining the "colour valence" which consists of three colour values and which unequivocally defines one colour. The reference system is the internationally agreed CIE system which is equivalent to the Standard Valence System defined in DIN 5033. Under the CIE system, the colour values are denoted X, Y and Z.

For measurement, the fibers are introduced into a round cuvette. The three-range colour measuring process is then carried out with an ELREPHO filter photometer of the type manufactured by the Carl Zeiss company, Oberkochen. In this process, the degree of remission of the test specimen is measured with three special colour measuring filters and the colour values X, Y and Z are calcualted in a simple manner from the remission values $R_x$, $R_y$, $R_z$ in accordance with the following formulae:
For standard light type C $$X = 0.782 \cdot R_x + 0.198 \cdot R_z$$

$$Y = R_y$$

$$Z = 1.181 \cdot R_z$$

The following examples are to further illustrate the invention without limiting it.

EXAMPLE 1

Before the transesterification of dimethyl terephthalate with ethylene glycol, 10% by weight of bis-ethoxylated tetramethyl bisphenol A, based on the DMT, are added to the reaction mixture. Transesterification takes place over a period of 2.75 hours, during which the temperature rises from 180° C to 220° C. This is followed by precondensation over a period of 0.75 hour at a temperature of 250° C. The temperature is then increased to 270° C and the pressure adjusted to 1 Torr for polycondensation.

Polycondensation is terminated after 2.5 hours. The copolyester is then spun off from the autoclave into water and granulated. The granulate thus obtained has a relative viscosity of 1.70 and a melting point of 243° C. It contains 10% by weight of the glycol of formula (I) in co-condensed form.

The granulate is melt-spun through a multibore spinnerette into filaments having an individual denier of 40 dtex which are wound up at a rate of 1100 meters per minute. The spun filaments are doubled into a tow with a total denier of 100,000 dtex, stretched in a ratio of 1:3.20 in hot water at 90° C and then in a steaming duct, crimped in a stuffer box, dried in the absence of tension in hot air and subsequently cut into staple fibers 60 mm long. The fibers show a strength of 3.5 p/dtex, an elongation of 30% and a boiling-water induced shrinkage of 1%.

The fibers are then dyed with the disperse dye:

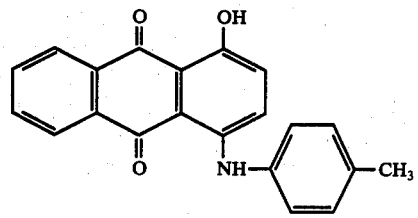

by the dyeing process described above (Method 2, without carrier). On completion of dyeing, the fibers are deep blue in colour. The staple fibers are introduced into the cuvette and the three-range colour measuring process described above is carried out.

The colour values observed are as follows:

X = 14.4

Y = 13.0

Z = 30.0

If the entire manufacturing process is carried out with a granulate of pure polyethylene terephthalate (relative viscosity 1.67) and if these fibers are dyed in the same way as described above, but in the presence of the carrier Levegal PT (Method 1) deep blue fibers are again obtained, their colour values being as follows:

X = 14.1

Y = 12.8

Z = 29.3

The fibers containing 10% by weight of bis-ethoxylated tetramethyl bisphenol A in co-condensed form can be dyed just as well and as quickly in the absence of carriers as fibers of pure polyethylene terephthalate can in the presence of carriers.

EXAMPLE 2

Before the transesterification of dimethyl terephthalate with 1,4-bis-(dihydroxymethyl)-cyclohexane, 10% by weight of bis-ethoxylated tetramethyl bisphenol A, based on DMT, are added to the reaction mixture. Transesterification takes place over a period of 2 hours, during which the temperature rises from 200° C to 260° C. The autoclave is under a pressure of 8 atms gauge. The autoclave is then vented and the temperature is increased to 295° C. The polycondensation reaction is then carried out over a period of 2.2 hours at a temperature of 295° C and under a pressure of 1 Torr.

The copolyester is then spun into water and granulated. The copolyester has a relative viscosity of 1.85 and a melting point of 290° C. The copolyester contains 7.1% by weight of the glycol of formula (I) in co-condensed form. The granulate is melt-spun through a multibore spinnerette into filaments having an individual denier of 10 dtex which are wound up at a rate of 1100 meters per minute. The spun filaments are doubled into a tow with a total denier of 100,000 dtex, stretched in a ratio of 1:3.20 in a steaming duct at 170° C, crimped in a stuffer box, dried in the absence of tension in hot air and then cut into 60 mm long staple fibers.

The fibers have a strength of 2.5 p/dtex, an elongation of 35% and a boiling-water induced shrinkage of 1%.

The fibers are dyed with the same disperse dye as in Example 1 by the dyeing process described above (Method 2, without carrier). Thereafter the fibers are deep blue in colour. They are introduced into a cuvette and the three-range colour measuring process described above is carried out.

The following colour values are observed:

X = 17.4

Y = 16.1

Z = 36.5

If the entire manufacturing process is carried out with a granulate of the pure polyester of terephthalic acid and 1,4-bis-(hydroxymethyl)-cyclohexane (relative viscosity 1.80) and if these fibers are dyed in the same way as described above, but in the presence of the carrier Levegal PT (Method 1), deep blue fibers are again obtained, their colour values being as follows:

X = 17.1

Y = 15.8

Z = 35.9

The fibers containing 7.1% by weight of bis-ethoxylated tetramethyl bisphenol A in co-condensed form can be dyed just as well and as quickly in the absence of carriers as fibers of the unmodified polyester can in the presence of carriers.

What we claim is:

1. Carrier-free dyeable filaments or fibers comprising a condensation product of terephthalic acid and a mixture of at least two glycols, one of which corresponds to the formula

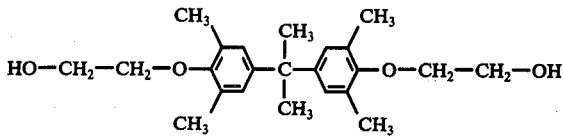

and is present in the amount of 4–15% by weight of the said condensation product.

2. Filaments or fibers of claim 1 wherein in addition to the glycol of the indicated formula said mixture includes a glycol selected from the group consisting of ethylene glycol, 1,4-butane diol, 1,4-bis-(hydroxymethyl)-cyclohexane and mixtures of said glycols.

3. Filaments or fibers of claim 2, comprising a terephthalic acid -ethylene glycol-bis($\beta$-hydroxyethyl)-tetramethyl bisphenol A- copolyester, said copolyester having a relative viscosity, as measured on a 1% solution in o-chlorophenol at 25° C in an Ubbelohde-viscosimeter, of 1.35 to 2.02.

4. Filaments or fibers of claim 2, comprising a terephthalic acid-1,4 butane diol-bis($\beta$-hydroxyethyl)-tetramethyl bisphenol A- copolyester, said copolyester having a relative viscosity, as measured on a 1% solution in o-chlorphenol at 25° C in an Ubbelohde-viscosimeter, of 1.53 to 1.97.

5. Filaments or fibers of claim 2, comprising a terephthalic acid - 1,4-cyclohexane dimethanol-bis($\beta$-hydroxyethyl) tetramethyl bisphenol A-copolyester, said copolyester having a relative viscosity, as measured on a 1% solution in o-chlorophenol at 25° C in an Ubbelohde-viscosimeter, of 1.33 to 2.15.

6. A textile article comprising filaments and fibers as claimed in claim 1.

7. Filaments or fibers of claim 1, wherein said condensation product contains from 5 to 12% by weight of the glycol of the indicated formula.